US012769920B2

(12) United States Patent
Barwin et al.

(10) Patent No.: US 12,769,920 B2
(45) Date of Patent: Oct. 20, 2026

(54) MODELING MANDREL TOLERANCE IN A DESIGN OF A SEMICONDUCTOR DEVICE

(71) Applicant: Synopsys, Inc., Mountain View, CA (US)

(72) Inventors: John E. Barwin, Essex Junction, VT (US); Jeroen Clemens Jozef Paasschens, Oss (NL); Amanda Woon-Fat, North York (CA); Gohar Movsisyan, Yerevan (AM); Marco Miguel Vaz Oliveira, Parede (PT)

(73) Assignee: Synopsys, Inc., Sunnyvale, CA (US)

( * ) Notice: Subject to any disclaimer, the term of this patent is extended or adjusted under 35 U.S.C. 154(b) by 812 days.

(21) Appl. No.: 18/129,663

(22) Filed: Mar. 31, 2023

(65) Prior Publication Data

US 2025/0328715 A1 Oct. 23, 2025

(30) Foreign Application Priority Data

Nov. 28, 2022 (AM) .......................... AM20220114Y

(51) Int. Cl.
*G06F 30/367* (2020.01)
*G06F 30/31* (2020.01)
*G06F 119/06* (2020.01)

(52) U.S. Cl.
CPC ............ *G06F 30/367* (2020.01); *G06F 30/31* (2020.01); *G06F 2119/06* (2020.01)

(58) Field of Classification Search
CPC .... G06F 30/367; G06F 30/31; G06F 2119/06; G06F 30/398; G06F 30/30; G06F 30/39; H10D 89/10
USPC .......................................................... 716/100
See application file for complete search history.

(56) References Cited

U.S. PATENT DOCUMENTS

| | | | |
|---|---|---|---|
| 8,881,084 B2 | 11/2014 | Shen et al. | |
| 10,885,260 B1 | 1/2021 | Wolpert et al. | |
| 2012/0273899 A1 * | 11/2012 | Wann ...................... | G06F 30/39 716/119 |
| 2012/0278781 A1 | 11/2012 | Wann et al. | |

(Continued)

OTHER PUBLICATIONS

International Search Report and Written Opinion for International Application No. PCT/US2023/080781, mailed Apr. 2, 2024, 14 Pages.

*Primary Examiner* — Paul Dinh
(74) *Attorney, Agent, or Firm* — Lowenstein Sandler LLP

(57) ABSTRACT

A computer-implemented method for modeling mandrel tolerance in a design of semiconductor device. The method includes receiving a multiple patterning (MPT) process design kit (PDK) for the semiconductor device. The PDK includes design parameters of a plurality of transistors that form at least part of the semiconductor device and a plurality of fins associated with each of the plurality of transistors. The method includes generating a fin index identifying each of the plurality of fins and grouping the fin indexes of the plurality of fins into two or more groups based on a type of fin. The method further includes identifying a mandrel mismatch in response to determining that a first fin index associated with a first transistor belongs to a group that is different from a second fin index associated with a second transistor. The method also includes determining a device parameter based on the mandrel mismatch identified.

17 Claims, 5 Drawing Sheets

(56) References Cited

U.S. PATENT DOCUMENTS

| | | | |
|---|---|---|---|
| 2015/0026657 | A1 | 1/2015 | Fu et al. |
| 2019/0155984 | A1 | 5/2019 | Chen et al. |

* cited by examiner

250 glbl_mndrl_sig -3 dvt_mndrl 15 mV

| | T1 | | | | | T2 | | | | | Mandrel Mismatch |
|---|---|---|---|---|---|---|---|---|---|---|---|
| | Fin Index | NFIN | GB | BA | dvt_local | Fin Index | NFIN | GB | BA | dvt_local | |
| 120 | 401 | 2 | 1 | 1 | 0 mV | 405 | 2 | 1 | 1 | 0 mV | 0 mV |
| 130 | 401 | 2 | 1 | 1 | 0 mV | 406 | 2 | 0 | 2 | -45 mV | 45 mV |
| 140 | 401 | 2 | 1 | 1 | 0 mV | 401 | 2 | 1 | 1 | 0 mV | 0 mV |
| 150 | 402 | 2 | 0 | 2 | -45 mV | 408 | 2 | 2 | 0 | 45 mV | 90 mV |
| 160 | 401 | 6 | 3 | 3 | 0 mV | 407 | 6 | 4 | 2 | 15 mV | 15 mV |

MODELING MANDREL TOLERANCE IN A DESIGN OF A SEMICONDUCTOR DEVICE

CROSS REFERENCE TO RELATED APPLICATIONS

This application claims priority to Armenian patent application no. AM20220114Y titled "MODELING MANDREL TOLERANCE IN A DESIGN OF A SEMICONDUCTOR DEVICE," filed on Nov. 28, 2022, the entire contents of which is incorporated herein by reference.

TECHNICAL FIELD

The present disclosure relates to electronic design automation. More specifically, embodiments disclosed herein relate to methods and systems for modeling hard mask or mandrel tolerances in an electronic design of a semiconductor device.

BACKGROUND

A design flow for a semiconductor device (e.g., integrated circuits (ICs)) typically includes the steps of transistor-level design and simulation to generate a schematic design. The design flow further includes creating a layout for the simulated schematic and running layout-versus-schematic (LVS) checks and design rule checks (DRC) on the layout. LVS refers to determining whether a particular IC layout corresponds to the original schematic design, while DRC refers to determining whether the physical layout of a particular chip satisfies a series of recommended parameters called design rules. The next step involves parasitic extraction, which is the calculation of the parasitic effects in designed devices and the required wiring interconnects of an electronic circuit. Parasitic effects may be caused by parasitic capacitances, parasitic resistances, and parasitic inductances, commonly called parasitic devices, parasitic components, or simply parasitics.

The purpose of parasitic extraction is to create an accurate analog model of the integrated circuit so that detailed simulations can emulate actual digital and analog circuit responses. Digital circuit responses are often used to populate databases for signal delay and loading calculation such as timing analysis, power analysis, circuit simulation, and signal integrity analysis. Analog circuits are often run in detailed test benches to indicate if the extracted parasitics will still allow the designed circuit to function as intended.

Interconnect capacitance, for example, is calculated by providing the extraction tool the top view layout of the design in the form of input polygons on a set of layers, a mapping to a set of devices and pins (from a LVS run), and a cross sectional understanding of these layers. This information is used to create a set of layout wires that have capacitors added where the input polygons and cross sectional structure indicate. The output netlist contains the same set of input nets as the input design netlist and adds parasitic capacitors, resistors, and inductors between these nets. The variability at circuit level can be broadly classified into global and local variability, depending on the scale at which the variability is dominant. Global variability includes lot-to-lot, wafer-to-wafer and die-to-die variability which mostly have a deterministic behavior, whereas local variability concentrates on intra-die variability which mostly includes statistical variability and deterministic local layout effects. Parasitic extraction annotates the netlist with interconnect models as well as deterministic local layout effects.

SUMMARY

One embodiment is a computer-implemented method for modeling mandrel tolerance in a design of semiconductor device. The method includes accessing a multiple patterning (MPT) process design kit (PDK) for the semiconductor device. The PDK includes design parameters of a plurality of transistors that form at least part of the semiconductor device and a plurality of fins associated with each of the plurality of transistors. The method includes generating a fin index identifying each of the plurality of fins, and grouping the fin indexes of the plurality of fins into two or more groups based on a type of fin. The method further includes identifying a mandrel mismatch in response to determining that a first fin index associated with a first transistor belongs to a group that is different from a second fin index associated with a second transistor. The method also includes determining a device parameter based on the identified mandrel mismatch. The device parameter may include one or more of threshold voltage ($V_t$), device gain, device noise, saturation current ($I_{on}$), subthreshold current ($I_{off}$), device power, device layout area, velocity saturation, mobility, or any accessible device parameter.

The method may also include identifying a mandrel match in response to determining that the first fin index associated with the first transistor belongs to the same group as the second fin index associated with the second transistor. The method further includes determining the device parameter based on the mandrel match identified. The method may also include identifying a partial match if at least one fin index associated with the first transistor belongs to the same group as one or more fin indexes associated with the second transistor. Determining the type of fin can be based on a first spacing on one side of the fin and a second spacing on another side of the fin. The design parameters included in the PDK may include at least a critical dimension (CD) of the plurality of fins, and the MPT process may include one or more of self-aligned double patterning (SADP), self-aligned triple patterning (SATP), self-aligned quadruple patterning (SAQP), or litho-etch-litho-etch (LELE).

Another embodiment is a system for optimizing or improving design of a semiconductor device. The system may include a processor, and a memory storing instructions, which when executed by the processor, cause the processor to perform operations including accessing a process design kit (PDK) for the semiconductor device. The PDK may include design parameters of a plurality of transistors that form at least part of the semiconductor device and a plurality of fins associated with each of the plurality of transistors. The instructions may further cause the processor to generate a fin index identifying each of the plurality of fins, and group the fin indexes of the plurality of fins into two or more groups based on a type of fin. The instructions may further cause the processor to, responsive to determining that a first fin index associated with a first transistor belongs to a group that is different from a second fin index associated with a second transistor, identify a mandrel mismatch. The instructions may further cause the processor to determine a device parameter based on the identified mandrel mismatch. The instructions may further cause the processor to modify the design of the semiconductor device to compensate for the mandrel mismatch.

Another embodiment is a non-transitory computer-readable medium storing instructions executable by a processor, causing the processor to perform operations including accessing a multiple patterning (MPT) process design kit (PDK) for the semiconductor device. The PDK may include design parameters of a plurality of transistors that form at least part of the semiconductor device and a plurality of fins associated with each of the plurality of transistors. The instructions may further cause the processor to generate a fin index identifying each of the plurality of fins, and group the fin indexes of the plurality of fins into two or more groups based on a type of fin. The instructions may further cause the processor to, responsive to determining that a first fin index associated with a first transistor belongs to a group that is different from a second fin index associated with a second transistor, identify a mandrel mismatch. The instructions may further cause the processor to determine a device parameter based on the mandrel mismatch identified. The MPT process may include one or more of self-aligned double patterning (SADP), self-aligned triple patterning (SATP), self-aligned quadruple patterning (SAQP), or litho-etch-litho-etch (LELE).

BRIEF DESCRIPTION OF THE DRAWINGS

The disclosure may be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
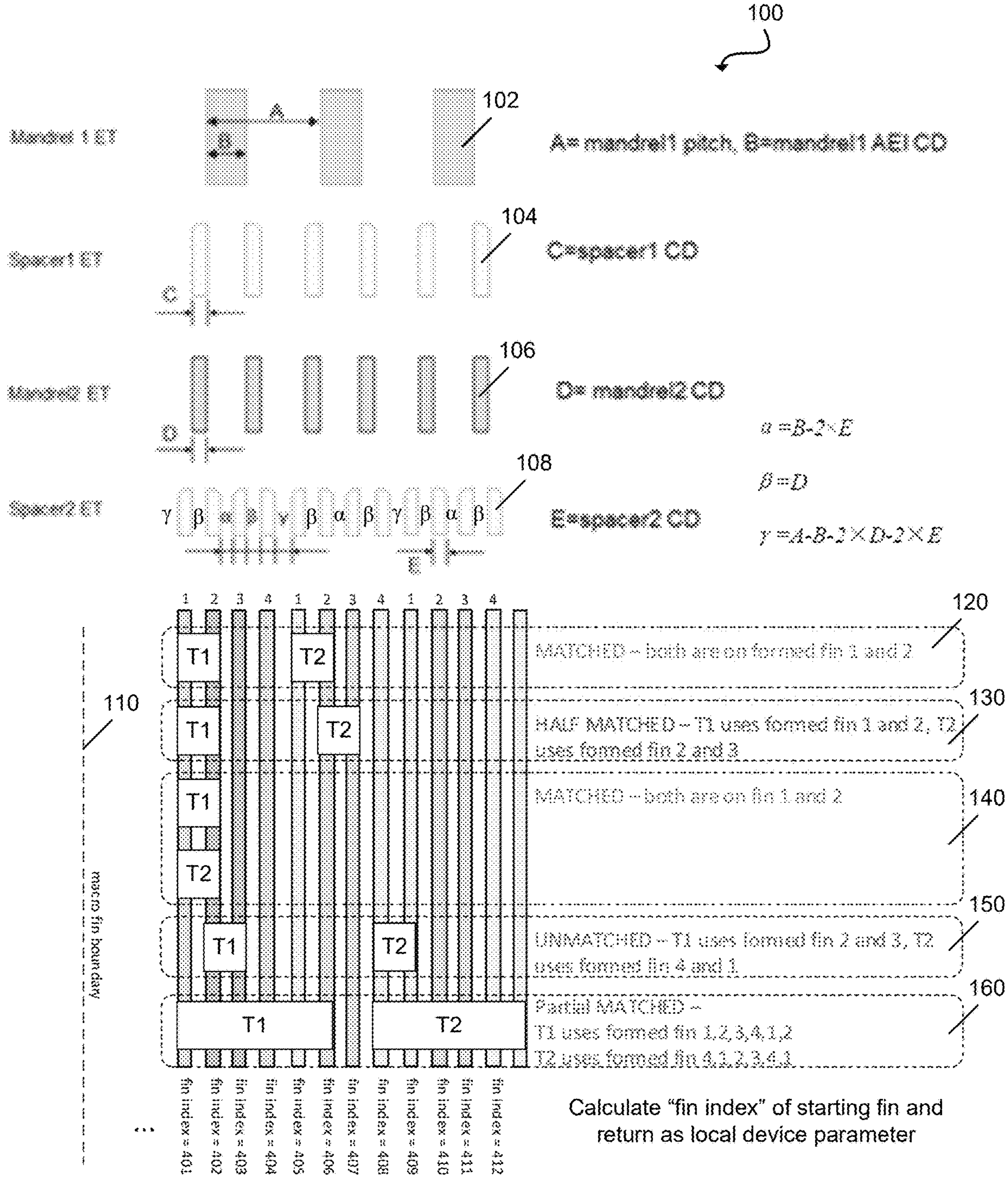
FIG. 1 illustrates a system for modeling mandrel tolerance and optimizing or improving design of a semiconductor device, in accordance with an embodiment of the present disclosure.

Advances in integrated circuit (IC) materials and design have yielded generations of ICs where successive generations have smaller and more complex circuits. As ICs evolve, the functional density (i.e., the number of interconnected devices per unit area) has generally increased and the critical dimension (i.e., the minimum feature size) has decreased. While dimensional scaling improves performance, increases production efficiency, and lowers costs, it has also increased the complexity of processing and manufacturing.

In the manufacture of integrated circuit (IC) chips at advanced technology nodes, for example, 14, 10 or 7 nm technologies, three-dimensional structures are increasingly used to define transistor devices. Devices such as fin field effect transistors (FinFETs) enable scaling of next generation gate lengths to 14 nm and below. FinFETs present a three-dimensional architecture where the transistor channel is raised above the surface of a semiconductor substrate, rather than locating the channel at or just below the surface. With a raised channel, the gate can be wrapped around the sides of the channel, which provides improved electrostatic control of the device.

The manufacture of FinFETs typically involves a self-aligned process (e.g., self-aligned quadruple patterning (SAQP)) to produce extremely thin fins, e.g., 20 nm wide or less, on the surface of a substrate using selective-etching techniques. A gate structure is then deposited to contact multiple surfaces of each fin to form a multi-gate architecture. Initially, a first or main masking process is performed to define a width and a pitch of fins of various fin structures of the integrated circuit device. A substrate including a stack of silicon (Si) and silicon dioxide ($SiO_2$) is provided. Alternatively or additionally, the substrate includes an elementary semiconductor, such as silicon or germanium, a compound semiconductor, such as silicon carbide, gallium arsenide, gallium phosphide, indium phosphide, indium arsenide, and/or indium antimonide, or combinations thereof.

An array of mandrels are disposed over the substrate, where adjacent mandrels are spaced from one another. The mandrels include a patterning or masking material, such as a resist material, polysilicon, silicon oxide, silicon nitride, other patterning or masking material, or combinations thereof. In an example, forming the mandrels includes depositing a patterning or masking layer (such as a polysilicon layer) over the substrate and forming a resist layer over the masking layer. The method further includes using a mandrel mask (which may be referred to as a main mask) to expose the resist layer to radiation, thereby forming exposed portions of the resist layer and unexposed portions of the resist layer. The method further includes removing the exposed portions or unexposed portions of the resist layer (for example, by subjecting the exposed resist layer to a developing solution), thereby forming a patterned resist layer that exposes portions of the masking layer and using the patterned resist layer to etch the masking layer, specifically, the exposed portions of the masking layer, to form the mandrels.

Spacers are formed over the substrate, such that each of the mandrels is surrounded by a spacer, and the mandrels are removed, for example, by an etching process, such that the spacers remain disposed over the substrate. The spacers include a patterning or masking material, such as silicon nitride (SiN). Other examples include a resist material, polysilicon, silicon oxide, other patterning or masking material, or combinations thereof. The spacers are formed by various deposition processes, lithography processes, etching processes, or combinations thereof. The spacers on opposite sidewalls of each mandrel have a width that is less than the width of each mandrel. The spacers on opposite sidewalls of each mandrel are also spaced from one another by a pitch that is less than the pitch of the mandrels. The spacers are used to form the fin structures of the integrated circuit device, which are hereinafter referred to as fins.

A plurality of such fins are arrayed over a semiconductor substrate and a gate, which typically includes one or more gate dielectric layers and one or more gate conductor layers, may be formed as a repeating structure that overlays the fins in an orthogonal dimension. In certain structures, the plurality of fins may be constructed as an array of repeating, equally-spaced, substantially vertical structures. A challenge in the fabrication of such repeating structures, however, is the control of the variability in the critical dimension as well as the pitch (d) or spacing(s) between neighboring features. Such variability is ubiquitous in conventional sidewall image transfer (SIT) photolithography techniques, for example, which are used to form finely-spaced fins.

As will be appreciated, the phenomenon of "pitch walking" or "fin walking" describes the occurrence of variability in the periodicity between structures, such as semiconductor fins within an array of fins. In some structures, an irregular fin spacing (and/or gate spacing) may result in the unintentional variation in performance of different transistors, which negatively impacts yield and increases cost. Such irregular fin spacing is referred to as a "mismatch" or a "matching issue" and should be identified and fixed during the simulation process so that the IC, SoC, or IP module subsequently produced has the desired power, performance, and area (PPA).

Accordingly, the present disclosure relates to mechanisms that identify the fin matching issue in a multi-processing technology (MPT) process, and provide a solution to compensate for an identified mismatch in a type of fin. One embodiment is a method of mapping MPT tolerances (or allowable error) as systematic parameters into an electronic circuit simulator model. The method uses layout versus schematic (LVS) to obtain a shape layout index, and reports the index to the electronic circuit simulator model instance. The method also allows modification of an electronic circuit simulator model to use the index to improve the electrical behavior and represent the known tolerance (or allowable error) of the MPT formed elements as deterministic offsets.

Advantages of the present disclosure include, but are not limited to decrease in simulation time because the method uses LVS to obtain a shape layout or fin index, and reports the fin index directly to the electronic circuit simulator model instance. The system allows for capturing fin mismatch into a PDK enablement to allow a more accurate prediction of hardware while allowing maximum flexibility in design. One advantage is that the system allows for better prediction of hardware characteristics, and better prediction of hardware characteristics lead to better designs when measured in terms of power, performance, and area (PPA). Additionally, the disclosed methods may move variation into a deterministic offset, and reduce the need for increased random variation in the models. Although the above embodiments relate to mixed-signal analog circuit layouts, the same processes may be applied to digital circuit layouts using similar methodologies described below. Similarly, although MPT is provided as an example, the methods can be applied to other patterning areas of concern, such as poly stripes, etc. Additionally, although fins are provided merely for illustratively examples, the above methods can be applied to structures other than fins, such as gates, poly stripes, etc.

FIG. 1 illustrates a system 300 for optimizing or improving a design of a semiconductor device, according to one embodiment. The foundry may provide a process design kit (PDK) including one or more design parameters. The PDK may be stored on a computer memory or may be accessed via a computer network. In one example, the design parameters may include the number of transistors, the type of transistors, the number of fins associated with each transistor, the fin width for each fin associated with the transistors in the PDK, the number of mask layers, and the mandrel tolerance for each layer. A mandrel tolerance is a quantitative representation of the deviation of the edges of a simulated mandrel image with respect to the edges of the target image. Typically, mandrel tolerances are expressed as geometric rules or constraints on the shapes relative to shapes on the same physical layer. If the mandrel image does not remain within tolerance or the allowable error, the mandrel image is iteratively modified or moved forward or backward (during simulation stage) until all of the simulated mandrel image edges are located within an accepted tolerance of the location of the target image. The design parameters may also include post-lithography critical dimension (CD) and sidewall angle (SWA) data, as well as post-etch critical dimension (CD) and sidewall angle (SWA) data associated with structures formed on the semiconductor substrate. In one example, the foundry providing the PDK may detail the mandrel tolerances involved in a SAQP fin process.

In the PDK shown in FIG. 1, mandrel 1 may include structures 102 having a pitch "A" (e.g., spacing between one edge of one structure and the same edge of a neighboring structure) and a critical dimension (CD) (e.g., width) of "B." Structure 102 may be included on one or more hard mask layers. The PDK may also include CD for spacers (or fins) 104 associated with structures 102 on mandrel 1, and the CD for the spacers 104 (e.g., width) may be indicated by "C." Structures 106 on mandrel 2 may be developed based on and correspond to the layout of spacers (or fins) 104. The CD (e.g., width) for structures 106 may be indicated by "D." Spacers (or fins) 108 may be developed based on structures 106 on mandrel 2. For example, each structure 106 may be associated with two spacers (or fins) 108; one on either side of structure 106. Each spacer (or fin) 108 may have a CD (e.g., width) of "E." Although only two steps are illustrated in this figure, the MPT process may have additional steps, which are not shown here for the sake of simplicity. Based on the layout provided by the PDK, fin spacings α, β, and γ may be determined using the following example equations:

$$\alpha = B - 2\times E \tag{1}$$

$$\beta = D \tag{2}$$

$$\gamma = A - B - 2\times D - 2\times E \tag{3}$$

α, β, and γ are provided purely as examples, and the layout may have additional fin spacings that are not shown here for the sake of simplicity.

Upon receiving the above design parameters, the system 300 may group the spacers (fins) 108 into groups based on the fin spacings on either sides of the fins 108. For example, in the layout illustrated in FIG. 1, the first fin 108 has a gamma spacing on the left side and a beta spacing on the right side. Therefore, the first fin may be termed as a gamma beta fin or simply GB type fin. Similarly, the second fin 108 has a beta spacing on the left side and an alpha spacing on the right side. Therefore, the second fin may be termed as a beta alpha fin or simply BA type fin. Furthermore, the third fin 308 has an alpha spacing on the left side and a beta spacing on the right side. Therefore, the third fin may be termed as an alpha beta fin or simply AB type fin. The fourth fin 308 has a beta spacing on the left side and a gamma spacing on the right side. Therefore, the fourth fin may be termed as a beta gamma fin or simply GB type fin, and so on and so forth. Since the example layout illustrated has four different fin spacings, the fins may be grouped into four groups, (i.e., GB type fins, BA type fins, AB type fins, and BG type fins).

After grouping the fins 108 in multiple fin types based on the spacings on either sides of the fins, the system 100 may generate a "fin index" identifying each of the fins 108. The fin index may identify each fin by a unique identifier, starting from the closest to the macro fin boundary 110 of the oxide diffusion layer that defines the active area for source, drain, and gate. For example, in the layout shown in FIG. 1, the first fin 108 may be indexed as fin index 401, the second fin may be indexed as fin index 402, the third fin may be indexed as fin index 403, the fourth fin may be indexed as fin index 404, and so on and so forth. The fin indexes for each of the fins 308 may be saved as a local device parameter for subsequent use by analog, RF, and mixed-signal electronic circuit simulators.

Following is an example code for layout versus schematic (LVS) generating a fin-index for a fin:

```
my_function: function (void) returning void
{
  fet_layer = dev_processing_layer("fet_layer");
  fin_count = floor(dev_box_length(fet_layer)/(FIN_SPACE+FIN_WIDTH) +1;
  if(dev_is_property("nfin")){
   dev_save_double_properties({{"fin_index", fin_count}});
  }
}
fet_layer1 =
enclose(gate,fin_boun,<=CELL_BOUND_DIST,NONE,direction=VERTICAL);
fet_layer_grow = not(edge_grow(fet_layer1,south=0.01),OD);
fet_layer = fet_layer1 interacting fet_layer_grow;
nmos(matrix, "n", sd, gate, sd,
properties = {{"fin_index", DOUBLE }},
property_function = my_function,
processing_layer_hash = { "fet_layer" => {fet_layer} }
 );
This can be passed to the device model call:
.subckt finfet
.param fin_index=1
.param nfin=1
$ nfin_blocks is the amount of blocks of 4 fins.
$ nfin_offset is the offset inside such a block.
.param nfin_blocks = int(nfin/4)
.param nfin_offset = fmod(nfin,4)
.param index_offset = fmod(fin_index,4)
.param starts_in_12 ='(index_offset==1) + (index_offset==2)'
.param starts_in_23 ='(index_offset==2) + (index_offset==3)'
.param nfin_ba = '2*nfin_blocks + starts_in_23*(nfin_offset>0) +
starts_in_12*(nfin_offset>1) + (1-starts_in_23)*(nfin_offset>2)'
.param nfin_ga = nfin-nfin_ba
.ends
```

FIG. 1 further illustrates five different set ups 120-160 using two different transistors, e.g. T1 and T2, and the system 100 is configured to identify a mismatch in a type of fin when a fin index associated with a first transistor (e.g., T1) belongs to a fin type that is different from a fin index associated with a second transistor (e.g., T2). In set up 120, both transistors are on formed fins 1 and 2, and therefore there is a mandrel (e.g., masking layer) match between the two transistors. In set up 130, T1 uses formed fins 1 and 2, T2 uses formed fins 2 and 3, and since formed fin 2 overlaps with both transistors, there is only a half match between transistor T1 and transistor T2. In set up 140, since both transistors are formed on fin 1 and fin 2, there is a mandrel (e.g., masking layer) match between the two transistors. However, in set up 150, T1 uses formed fins 2 and 3, and T2 uses formed fins 4 and 1. Therefore, the system 100 identifies this set up as a mandrel mismatch. Similarly, in set up 160, T1 uses formed fins 1, 2, 3, 4, 1, 2 (spanning over 6 fins (nfin)), and T2 uses formed fins 4, 1, 2, 3, 4, 1 (also spanning over 6 fins (nfin)). Since fins 1, 2, 3, 4 are common to both transistors, the system 100 identifies this set up as a "partial match."

Figures 2A, 2B:
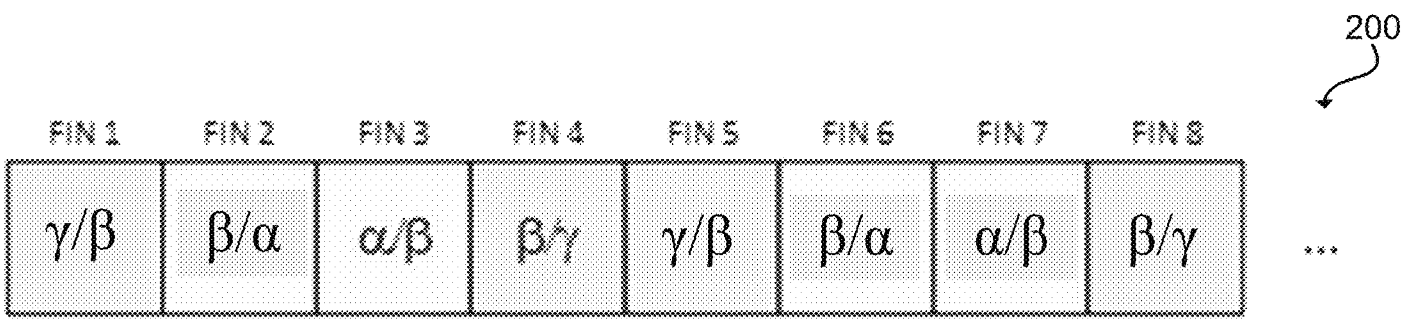
FIG. 2A illustrates example fin types in an example system for modeling fin mandrel tolerance and optimizing or improving design of a semiconductor device, in accordance with an embodiment of the present disclosure.
FIG. 2B illustrates an example set up in a system for modeling mandrel tolerance and optimizing or improving design of a semiconductor device, in accordance with an embodiment of the present disclosure.

FIG. 2A illustrates example fin types 200 discussed above, which are based on the layout illustrated in FIG. 1, for example. The table 250 illustrated in FIG. 2B shows how the system 100 not only identifies a mandrel mismatch when that occurs, but also determines a device parameter (e.g., threshold voltage, Vt) based on the mandrel mismatch identified. The set ups 120-160 shown in FIG. 1 each correspond to a row in table 250 shown in FIG. 2B. The device parameter may include other parameters such as device gain, device noise, saturation current ($I_{on}$), subthreshold current ($I_{off}$), device power, device layout area, velocity saturation, mobility, or any accessible device parameter. Based on the mandrel mismatch identified and the offset in device parameter that may result from using this design, the design engineer may modify their layout/design to compensate for that mandrel mismatch or rectify that mandrel mismatch, thereby optimizing or improving the performance (PPA) of the semiconductor device that may be produced using the modified design. In the example shown in Table 250, the global device parameters may be provided as follows:

$$glb1\_mndrl\_sig = -3$$

$$dvt\_mndrl = 0.015$$

Based on these inputs, the local device parameters may be calculated using the formula:

$$dvt\_local = ((nfin\_bg/nfin) * glbl\_mndrl\_sig * dvt\_mndrl) + ((nfin\_ga/nfin) * -1 * glbl\_mndrl\_sig * dvt\_mndrl)$$

where "glbl_mndrl_sig" is the global mandrel sigma, which designers can override if they want to see the one sigma impact, or use a full three sigma impact instead. The term "dvt_mndrl" is the change in threshold voltage (Vt) per sigma of the mandrel, or change in any device parameter such as velocity saturation, mobility, or any accessible device parameter, per sigma of the mandrel, which may be supplied by a foundry in some embodiments. This formula adds a systematic offset (proportionally based) to fins that are not similarly formed. For example, this formula sums up the total BG formed fins and the total GA formed fins, weights them against the sigma of variation, and sums the two vectors. In some embodiments, true random variation can be added on top of the systematic offset. Although self-aligned quadruple patterning (SAQP) is used as an example in the above embodiment, the MPT process may include other techniques, such as self-aligned double patterning (SADP), self-aligned triple patterning (SATP), or litho-etch-litho-etch (LELE). System 100 can modify any existing simulation software model to accept the "fin index" parameter, and along with the standard nfin value, it may be used for shaping the systematic (e.g., global) offset to any available model parameter. Additionally, while the above shows impacts only on Vt, any of the device instance parameters can be accessed in this manner, and weighted by any method that can be defined in an equation.

Figure 3:
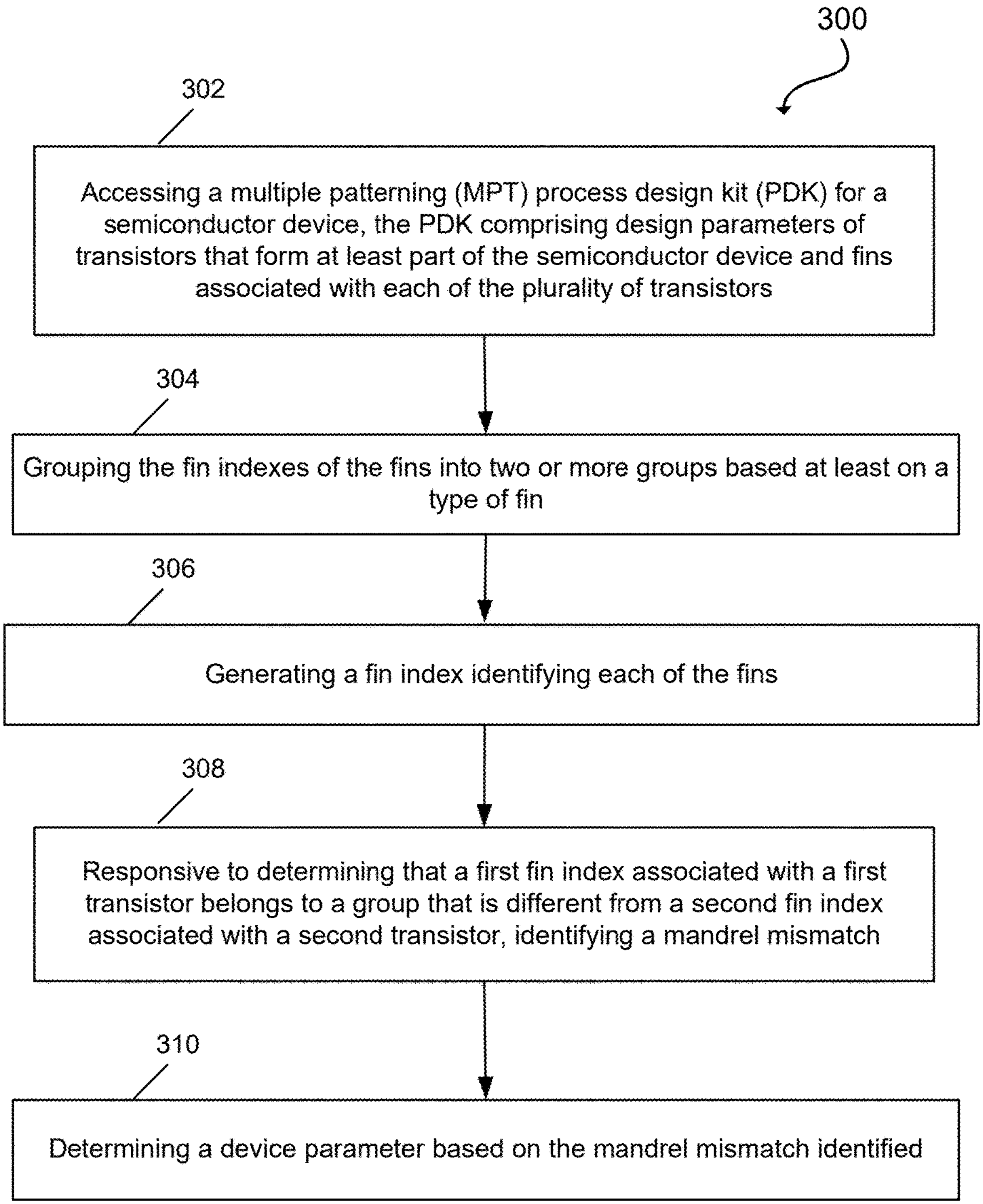
FIG. 3 illustrates example operations in a computer-implemented method for modeling mandrel tolerance and optimizing or improving design of a semiconductor device, in accordance with an embodiment of the present disclosure.

FIG. 3 illustrates example operations in a computer-implemented method 300 for modeling mandrel tolerance and optimizing or improving design of a semiconductor device, in accordance with an embodiment of the present disclosure. The method 300 may be implemented by a processor of a computer, for example, and the instructions may be stored in a memory of the computer, which will be described in further detail with respect to FIG. 5. At operation 302, the processing logic may access a MPT PDK for a semiconductor device. A foundry may provide the process design kit (PDK) including one or more design parameters. The PDK may be stored on a computer memory or may be accessed, via a computer network. In one example, the design parameters may include the number of transistors, the type of transistors, the number of fins associated with each transistor, the fin width for each fin associated with the transistors in the PDK, the number of hard mask layers, and the hard mask (mandrel) tolerance for each layer. The design parameters may also include post-lithography critical dimension (CD) and sidewall angle (SWA) data, as well as post-etch critical dimension (CD) and sidewall angle (SWA) data associated with structures formed on the semiconductor substrate. The foundry providing the PDK may have detailed the tolerances involved in a SAQP fin process.

The PDK may also include multiple structures (e.g., mandrels) having a pitch (e.g., spacing between one edge of one structure and the same edge of a neighboring structure) and a critical dimension (CD). The mandrels may be included on one or more hard mask layers. The PDK may also include CD for spacers (or fins) associated with the mandrels. For example, each structure may be associated with two spacers (or fins), one on either side of the structures. In some embodiments, LVS may be also used to ascertain local layout effects of the physical devices. For example, when LVS maps the physical graphic design system (GDS into a netlist, it can also determine proximity effects, and report those effects to each individual devices in the extracted netlist. In some embodiments, the processing logic may use this feature of LVS to receive the indexed value of the MPT formed elements.

Upon receiving the above design parameters, the processing logic may, at operation 304, group the spacers (fins) into multiple groups based on the fin spacings on either side of the fins. For example, if the first fin has a beta spacing on the left side and a gamma spacing on the right side, the first fin may be termed as a beta gamma fin or simply BG type fin. Similarly, if the second fin has a gamma spacing on the left side and an alpha spacing on the right side, the second fin may be termed as a gamma alpha fin or simply GA type fin. Similarly, if the third fin has an alpha spacing on the left side and a beta spacing on the right side, the third fin may be termed as an alpha beta fin or simply AB type fin, and so on and so forth.

At operation 306, after grouping the fins in fin types based on the spacings on either side of the fins, the processing logic may generate a "fin index" identifying each of the plurality of fins. The fin index may identify each fin by a unique identifier, starting from the closest to a macro fin boundary of the oxide diffusion layer that defines the active area for source, drain, and gate. The fin indexes for each of the fins may be saved as a local device parameter for subsequent use by analog, RF, and mixed-signal electronic circuit simulator models.

Two transistors, T1 and T2, having the same number of fins and the same type of fins should ideally have a 100% match in fin type, and if there is even a slight mismatch (i.e., less than 100% match) in the fin type, then the processing logic may be able to identify that mismatch in fin type. At operation 308, the processing logic may identify a mismatch in a type of fin when a fin index associated with a first transistor (e.g., T1) belongs to a fin type that is different from a fin index associated with a second transistor (e.g., T2). For example, if both transistors are on formed fins 1 and 2, the processing logic may identify that there is a mandrel match between the two transistors. In another example, if T1 uses formed fins 1 and 2, and T2 uses formed fins 2 and 3, and since formed fin 2 overlaps with both transistors, the processing logic may identify that there is a half match between transistor T1 and transistor T2. In another example, if both transistors are formed on fin 1 and fin 2, the processing logic may identify that there is a mandrel match between the two transistors. In a further example, if T1 uses formed fins 2 and 3, and T2 uses formed fins 4 and 1, the processing logic may identify this set up as a mandrel mismatch. Similarly, if T1 uses formed fin 1, 2, 3, 4, 1, 2 (spanning over 6 fins (nfin)), and T2 uses formed fins 4, 1, 2, 3, 4, 1 (also spanning over 6 fins (nfin)), since fins 1, 2, 3, 4 are common to both transistors, the processing logic may identify this set up as a "partial match."

At operation 310, the processing logic determines a device parameter (e.g., threshold voltage, Vt) based on the mandrel mismatch identified. The device parameter may include other parameters such as device gain, device noise, saturation current ($I_{on}$), subthreshold current ($I_{off}$), device power, device layout area, velocity saturation, mobility, or any accessible device parameter. Based on the mandrel mismatch identified and the offset in device parameter that may result from using this design, the layout/design may be modified to compensate for the mandrel mismatch or rectify the mandrel mismatch, thereby optimizing or improving the power, performance, and area (PPA) of the semiconductor device that is produced using the modified design. One example method to compensate for the mandrel mismatch is to move either transistor T1 or T2 such that the fin types match on both transistors, and the mandrel mismatch is eliminated.

Although SAQP is used as an example in the above embodiment, the MPT process may include other techniques, such as self-aligned double patterning (SADP), self-aligned triple patterning (SATP), self-aligned quadruple patterning (SAQP), or litho-etch-litho-etch (LELE). The method disclosed above can modify any existing simulation software model (e.g., Spice® model) to accept the "fin index" parameter, and along with the standard nfin value, it may be used for shaping the systematic (e.g., global) offset to any available Spice® model parameter. Additionally, while the above shows impacts only on Vt, any of the device instance parameters can be accessed in this manner, and weighted by any method that can be defined in an equation.

Figure 4:
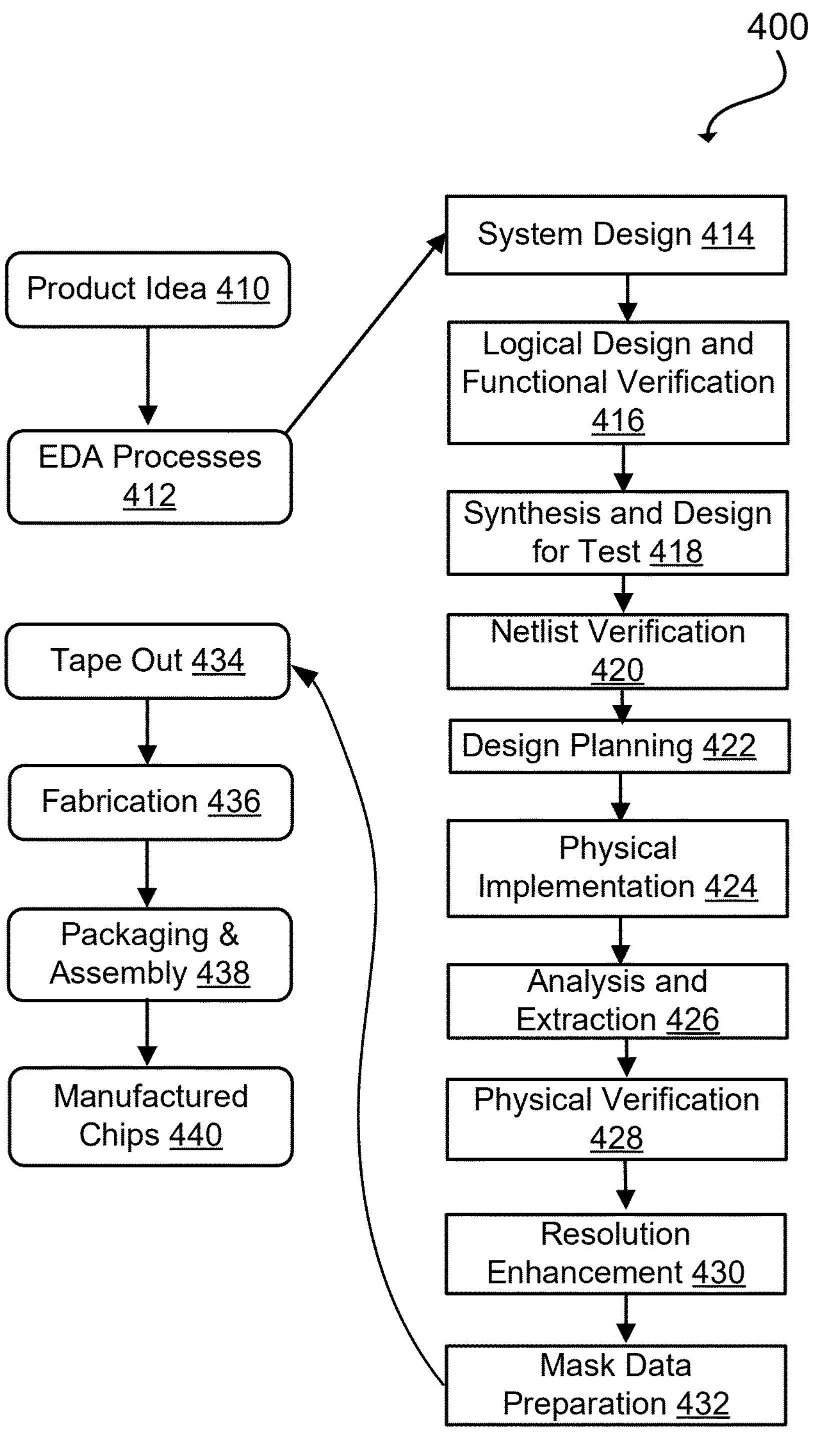
FIG. 4 depicts a flowchart of various processes used during the design and manufacture of an integrated circuit in accordance with some embodiments of the present disclosure.

FIG. 4 illustrates an example set of processes 400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes can start with the creation of a product idea 410 with information supplied by a designer, information which is transformed to create an article of manufacture that uses a set of EDA processes 412. When the design is finalized, the design is taped-out 434, which is when artwork (e.g., geometric patterns) for the integrated circuit is sent to a fabrication facility to manufacture the mask set, which is then used to manufacture the integrated circuit. After tape-out, a semiconductor die can be fabricated 436 and packaging and assembly processes 438 can be performed to produce the finished integrated circuit 440.

Specifications for a circuit or electronic structure may range from low-level transistor material layouts to high-level description languages. A high-level of abstraction may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which can be used for detailed descriptions of circuits with many analog components. Descriptions at each level of abstraction are enabled for use by the corresponding tools of that layer (e.g., a formal verification tool). A design process may use a sequence depicted in FIG. 4. The processes described herein can be enabled by EDA products (or tools).

During system design 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 414, modules or components in the circuit can be specified in one or more description languages and the specification can be checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' can be used to speed up the functional verification.

During synthesis and design for test 418, HDL code can be transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 420, the netlist can be checked for compliance with timing constraints and for correspondence with the HDL code. During design planning 422, an overall floor plan for the integrated circuit can be constructed and analyzed for timing and top-level routing.

During layout or physical implementation 424, physical placement (positioning of circuit components such as transistors or capacitors) and routing (connection of the circuit components by multiple conductors) can occur, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and can be enabled as both physical structures and in simulations. Parameters can be specified for selected cells (based on 'standard cells') such as size and made accessible in a database for use by EDA products.

During analysis and extraction 426, the circuit function can be verified at the layout level, which permits refinement of the layout design. During physical verification 428, the layout design can be checked to ensure that manufacturing constraints are correct, such as DRC constraints, electrical constraints, lithographic constraints, and that circuitry function matches the HDL design specification. During resolution enhancement 430, the geometry of the layout can be transformed to improve how the circuit design is manufactured.

During tape-out, data can be created to be used (after lithographic enhancements are applied if appropriate) for production of lithography masks. During mask data preparation 432, the 'tape-out' data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 5:
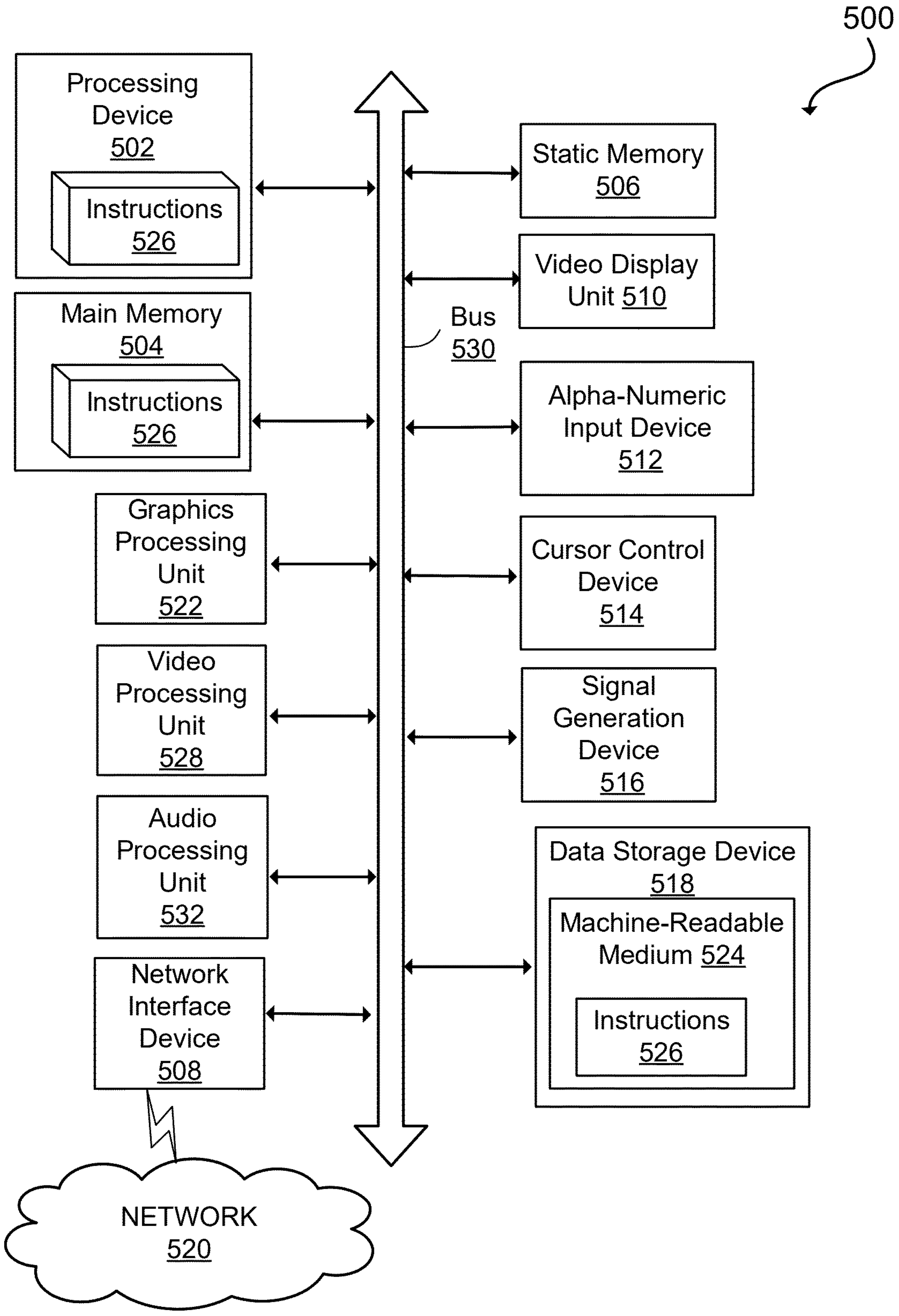
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked)

to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one embodiment, the non-transitory computer readable medium may include instructions 726 which when executed by a processing device (e.g., processing device 702), cause the processing device to generate a digital representation of a level-shifting circuit. The level-shifting circuit may include a level shifter configured to receive a first clock signal associated with a first power level (VDDP) and generate a second clock signal associated with a second power level (VDDA). The second power level may be greater than the first power level. The level-shifting circuit may further include an input clock buffer including a first input including the second clock signal from the level shifter, and a second input coupled in parallel to the first input; the second input including the first clock signal. In one embodiment, the first power level includes a peripheral voltage and the second power level includes a bitcell array voltage. The input clock buffer may be configured to generate an output clock signal when a difference between the second power level and the first power level is above a determined threshold voltage, and generate the output clock signal when the difference between the second power level and the first power level is below the determined threshold voltage. The output clock signal may be provided as inputs to a memory periphery and a memory timer, and the memory periphery and memory timer may be coupled in parallel to the input clock buffer.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It may be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It may be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for modeling mandrel tolerance in a design of a semiconductor device, the method comprising:

accessing design parameters of a plurality of transistors that form at least part of the semiconductor device, the design parameters corresponding to plurality of fins associated with each of the plurality of transistors;

generating a fin index identifying each of the plurality of fins;

grouping the fin indexes of the plurality of fins into two or more groups based on respective fin types of the plurality of fins, wherein the respective fin types are determined based on a first spacing between each fin and an adjacent fin on one side of each fin and a second spacing between each fin and an adjacent fin on another side of each fin;

responsive to determining that a first fin index associated with a first transistor of the plurality of transistors belongs to a group that is different from a second fin index associated with a second transistor of the plurality of transistors, identifying a mandrel mismatch; and determining, by a processing device, a device parameter based on the identified mandrel mismatch.

2. The method of claim 1, wherein the device parameter comprises one or more of threshold voltage, device gain, device noise, saturation current, subthreshold current, device power, device layout area, velocity saturation, mobility, or any accessible device parameter.

3. The method of claim 1, further comprising:

responsive to determining that the first fin index associated with the first transistor of the plurality of transistors belongs to a same group as the second fin index associated with the second transistor of the plurality of transistors, identifying a mandrel match; and determining the device parameter based on the identified mandrel match.

4. The method of claim 1, further comprising:

identifying a partial match if at least one fin index associated with the first transistor of the plurality of transistors belongs to the same group as one or more fin indexes associated with the second transistor of the plurality of transistors.

5. The method of claim 1, wherein the design parameters of the plurality of fins comprises at least a critical dimension (CD) of the plurality of fins.

6. The method of claim 1, wherein the design parameters are included in a multi-patterning technology (MPT) process design kit (PDK), and the MPT process comprises one or more of self-aligned double patterning (SADP), self-aligned triple patterning (SATP), self-aligned quadruple patterning (SAQP), or litho-etch-litho-etch (LELE).

7. A system for improving a design of a semiconductor device, the system comprising:

a processor; and a memory storing instructions, which when executed by the processor, cause the processor to perform operations comprising:

accessing design parameters of a plurality of transistors that form at least part of the semiconductor device, the design parameters comprising a plurality of fins associated with each of the plurality of transistors;

generating a fin index identifying each of the plurality of fins;

grouping the fin indexes of the plurality of fins into two or more groups based on respective fin types of the plurality of fins, wherein the respective fin types are determined based on a first spacing between each fin and an adjacent fin on one side of each fin and a second spacing between each fin and an adjacent fin on another side of each fin;

responsive to determining that a first fin index associated with a first transistor of the plurality of transistors belongs to a group that is different from a second fin index associated with a second transistor of the plurality of transistors, identifying a mandrel mismatch; and determining a device parameter based on the identified mandrel mismatch.

8. The system of claim 7, wherein the device parameter comprises one or more of threshold voltage ($V_t$), device gain, device noise, saturation current ($I_{on}$), subthreshold current ($I_{off}$), device power, device layout area, velocity saturation, mobility, or any accessible device parameter.

9. The system of claim 7, wherein the instructions further cause the processor to perform operations comprising:

responsive to determining that the first fin index associated with the first transistor of the plurality of transistors belongs to the same group as the second fin index associated with the second transistor of the plurality of transistors, identifying a mandrel match; and determining the device parameter based on the identified mandrel match.

10. The system of claim 7, wherein the instructions further cause the processor to perform operations comprising:

identifying a partial match if at least one fin index associated with the first transistor of the plurality of transistors belongs to the same group as one or more fin indexes associated with the second transistor of the plurality of transistors.

11. The system of claim 7, wherein the design parameters of the plurality of fins comprises at least a critical dimension (CD) of the plurality of fins, and the CD comprises a width of the plurality of fins.

12. The system of claim 7, wherein the instructions further cause the processor to perform operations comprising:

modifying the design of the semiconductor device to compensate for the identified mandrel mismatch.

13. A non-transitory computer-readable medium storing instructions executable by a processor, causing the processor to perform operations comprising:

accessing design parameters of a plurality of transistors that form at least part of a semiconductor device, the design parameters comprising a plurality of fins associated with each of the plurality of transistors;

generating a fin index identifying each of the plurality of fins;

grouping the fin indexes of the plurality of fins into two or more groups based on respective fin types of the plurality of fins, wherein the respective fin types are determined based on a first spacing between each fin and an adjacent fin on one side of each fin and a second spacing between each fin and an adjacent fin on another side of each fin;

responsive to determining that a first fin index associated with a first transistor of the plurality of transistors belongs to a group that is different from a second fin index associated with a second transistor of the plurality of transistors, identifying a masking layer mismatch; and determining a device parameter based on the identified masking layer mismatch.

14. The non-transitory computer-readable medium of claim 13, wherein the device parameter comprises one or more of threshold voltage ($V_t$), device gain, device noise, saturation current ($I_{on}$), subthreshold current ($I_{off}$), device power, device layout area, velocity saturation, mobility, or any accessible device parameter.

15. The non-transitory computer-readable medium of claim 13, wherein the instructions further cause the processor to perform operations comprising:

responsive to determining that the first fin index associated with the first transistor of the plurality of transistors belongs to the same group as the second fin index associated with the second transistor of the plurality of transistors, identifying a masking layer match; and determining the device parameter based on the identified masking layer match.

16. The non-transitory computer-readable medium of claim 13, wherein the instructions further cause the processor to perform operations comprising:

identifying a partial match if at least one fin index associated with the first transistor of the plurality of transistors belongs to the same group as one or more fin indexes associated with the second transistor of the plurality of transistors.

17. The non-transitory computer-readable medium of claim 13, wherein the design parameters are included in a multi-patterning technology (MPT) process design kit (PDK), and wherein the MPT process comprises one or more of self-aligned double patterning (SADP), self-aligned triple patterning (SATP), self-aligned quadruple patterning (SAQP), or litho-etch-litho-etch (LELE).

* * * * *